(12) United States Patent
Mestdagh

(10) Patent No.: US 7,277,381 B2
(45) Date of Patent: Oct. 2, 2007

(54) METHOD OF DATA TRANSMISSION BY ORTHOGONAL FREQUENCY-DIVISION MULTIPLEXING

(75) Inventor: Denis J. Mestdagh, Saint Martin d'Uriage (FR)

(73) Assignee: STMicroelectronics S.A., Montrouge (FR)

( * ) Notice: Subject to any disclaimer, the term of this patent is extended or adjusted under 35 U.S.C. 154(b) by 1094 days.

(21) Appl. No.: 10/163,175

(22) Filed: Jun. 5, 2002

(65) Prior Publication Data

US 2002/0186714 A1    Dec. 12, 2002

(30) Foreign Application Priority Data

Jun. 6, 2001 (FR) .................................. 01 07392

(51) Int. Cl.
*H04J 11/00* (2006.01)

(52) U.S. Cl. ........................ 370/208; 370/342; 375/260

(58) Field of Classification Search ................ 370/204, 370/208, 335–336, 342–343, 419, 201; 455/63.1–72, 455/114.2, 278.1, 296, 501–506
See application file for complete search history.

(56) References Cited

U.S. PATENT DOCUMENTS 6,661,771 B1 * 12/2003 Cupo et al. ................. 370/204
7,082,159 B2 * 7/2006 Larsson ....................... 375/224
2002/0055356 A1 * 5/2002 Dulin et al. ................. 455/422
2005/0068886 A1 * 3/2005 Wang et al. ................. 370/210
2005/0276339 A1 * 12/2005 Chow et al. ................. 375/260

FOREIGN PATENT DOCUMENTS

| EP | 0 933 897 A2 | 8/1999 |
| EP | 1 065 818 A1 | 1/2001 |
| GB | 2 332 602 A | 6/1999 |
| WO | WO99 12764 A1 | 5/1999 |

OTHER PUBLICATIONS

French Search Report from French Patent Application 01/07392, filed Jun. 6, 2001.

* cited by examiner

*Primary Examiner*—Chi Pham
*Assistant Examiner*—Thai Hoang
(74) *Attorney, Agent, or Firm*—Lisa K. Jorgenson; William R. McClellan; Wolf, Greenfield & Sacks, P.C.

(57) ABSTRACT

A method for transmitting data between at least three nodes of an orthogonal frequency-division multiplexing network, including assigning to each node at least one transmit frequency and one receive frequency, the assigned frequencies being different from one node to the other; forming data symbols to be transmitted all having the same duration whatever the transmission node; and adding, to each transmitted symbol, a cyclic prefix and a cyclic suffix reproducing a predetermined number of samples, respectively of the end and of the beginning of the symbol.

26 Claims, 2 Drawing Sheets

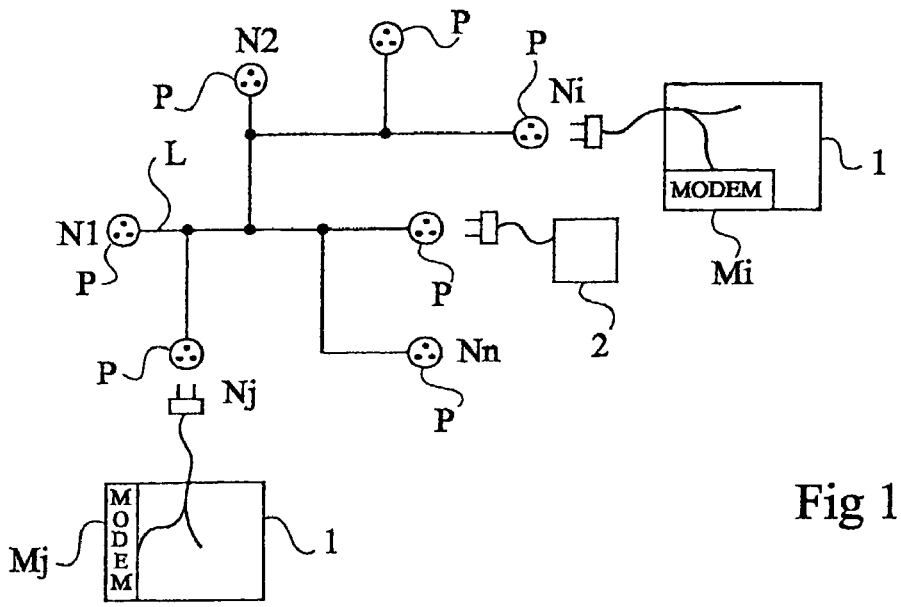
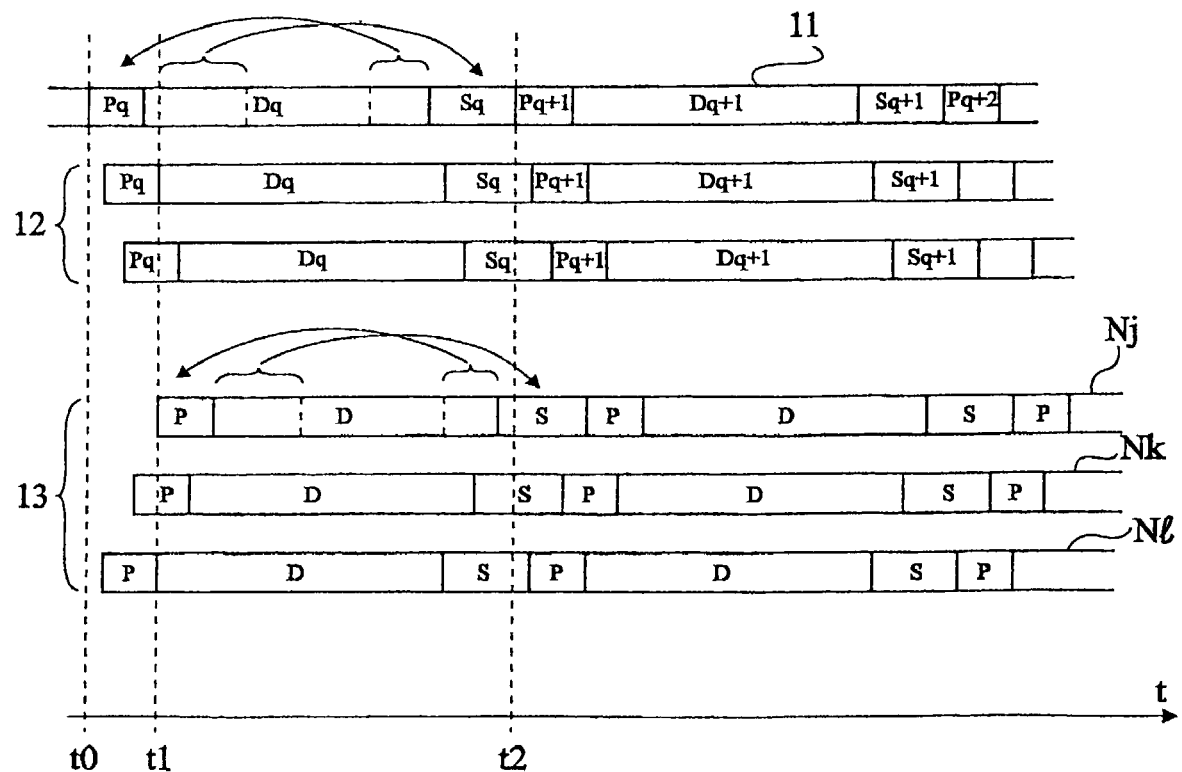
Fig 1
Fig 2

METHOD OF DATA TRANSMISSION BY ORTHOGONAL FREQUENCY-DIVISION MULTIPLEXING

BACKGROUND OF THE INVENTION

1. Field of the Invention

The present invention relates to the field of shared multipoint-to-multipoint communication networks.

The present invention will be described hereafter in relation with an example of application to networks using the electric supply conductors (for example, the mains) as a transmission medium. High-frequency sub-carriers which are modulated to transmit data between one or several devices equipped with modems (modulator-demodulator) and connected to the mains are generally used. Such networks may be used, for example, to connect a microcomputer to its peripherals (printer, scanner, etc.). They may also distribute, within a home, an office or the like, multimedia data coming from a connection to an external access, for example, a satellite antenna, an optical fiber cable, a modem cable, an XDSL modem, etc.

2. Discussion of the Related Art

Since various devices may simultaneously need to transmit information over the shared network, an access control mechanism of the transmission means (MAC) is necessary to avoid collisions which would result in information losses. Further, since different multimedia services or transmission types are likely to use the same electric supply conductors and since these different transmissions most often have distinct constraints in terms of delay, bit error rate, etc., an access priority management mechanism more generally designated as a quality-of-service control (QOS) is generally used.

FIG. 1 very schematically shows an exemplary architecture of a transmission network using electric supply conductors L as a transmission medium. The electric supply network connects different taps P together, possibly via an electric board provided with circuit breakers or the like (not shown). Taps P have been symbolized in FIG. 1 as being taps with three conductors (phase, neutral and ground). However, these also may be taps only having two conductors (phase and neutral). From the point of view of the transmission network, each tap is considered as a node N1, ..., Ni, ..., Nj, ..., Nn.

Among the various electric devices connected to the network, devices 1 of a first type are equipped with a modem Mi, Mj respectively connected to nodes Ni, Nj to communicate over the network thus formed. In the example of FIG. 1, a device 2 connected on one of the taps is a modem-free device which is only supplied by the electric network.

Most often, each device 1 of the first type connected to any tap from the point of view of the electric supply (node from the point of view of the network) should be able to send and receive data. The network is accordingly a so-called point-to-multipoint or multipoint-to-multipoint network.

The data transmission protocols over shared networks can be grouped in three large categories. A first category concerns time-division multiple accesses (TDMA or TDD), which assign different time slots to each transmission. A second category groups code-division multiple accesses (CDMA) which assign different codes for each transmission. A third category concerns frequency-division multiple accesses (FDMA or FDD), which assign one or several frequencies to each transmission.

All these transmission systems are generally used in multipoint to point systems such as, for example, GSM mobile telephony communication systems. They however all have disadvantages in the point-to-multipoint or multipoint-to-multipoint communication systems to which the present invention applies.

For time-division transmissions, significant dead times must be provided between each data sequence sent by each device. These dead times must be inserted to avoid collisions between packets transmitted by different nodes, while taking account of all possible reflections and multiple paths between the transmitter and the receiver. This disadvantage can significantly reduce the network capacity due to the decrease in general transmission rate.

For code-division transmissions, flow rate limitations on the order of a few hundreds of kilobits per second (at most, a few megabits per second) are observed in practice due to the complexity of managing the multiple users which causes a lot of interference, and to the level differences of the received signal according to the paths to be followed by the different signals. The implementation of an efficient code-division system requires significant means, which can quickly reach a prohibitive cost. Further, the spectral density of a code-division transmission extends over the entire usable bandwidth, which makes this type of transmission incompatible with electromagnetic compatibility requirements, which require being able to forbid transmissions in certain specific frequency bands.

The present invention more specifically relates to a frequency-division transmission which, with current techniques, remains poorly adapted to point-to-multipoint or multipoint-to-multipoint transmissions in a network having more than two nodes.

Indeed, in a frequency-division multiple access, each device is assigned a predefined set of frequencies to transmit data. On the receive side, there exist two solutions. Either a communication control channel is used to indicate which frequencies must be received and demodulated by each device connected to the multipoint-to-multipoint network. Or all receive frequencies are demodulated by all devices and each receive device selects the information intended for it.

A disadvantage of the conventional frequency-division multiple access is that it requires analog filters to separate the frequencies or groups of frequencies used for the modem transmit and receive sections. This is a major disadvantage in terms of flexibility and frequency adaptation capability since the analog filters which are formed cannot be modified according to the dynamic capacitance needs or to any other reason requiring modification of the assigned frequencies. On this regard, a specificity of networks using the supply conductors as a transmission support is that the network transfer function is likely to strongly vary, for example, upon plugging of an electric device (be it or not equipped with a modem) on the mains.

Conventionally, standards relative to networks using the supply network as a transmission medium provide the combined use of a frequency-division multiple access and of a time-division multiple access. This actually is a carrier detection and collision or anticollision detection multiple access (CSMA/CA). According to these transmission standards, the frequency-division multiple access is implemented by using an orthogonal frequency-division multiplexing (OFDM).

This is a well known technique which will be briefly reminded hereafter. Reference can also be made to literature. For example, article "HomePlug Standard Brings Networking to the Home" by Steve Gardner, Brian Markwalter, and Larry Yonge, published in December 2000 in Communication Systems Design, which is incorporated herein by reference, discusses the application of such a multiplexing to networks using electric power cables as a transmission support.

The OFDM waveforms are generated by using inverse Fourier transforms (IFFT) in which the points of the frequency field are formed by complex sets of symbols which modulate each carrier. The result of the inverse Fourier transform is called an OFDM symbol. On the receive side, the data are reconstituted from a direct Fourier transform which converts the OFDM symbol in the frequency field.

The present invention aims at providing a novel data transmission technique by orthogonal frequency-division multiplexing which avoids use of analog filters to separate the frequencies or groups of frequencies used by modems.

The present invention takes its inspiration from a transmission technique known in telephony which is known for being more flexible in terms of frequency assignment. This technique, known as the Zipper-DMT, is only conventionally used for point-to-point transmissions and is described, for example, in European patent application No. 0,883,944 and in article "Zipper VDSL: A Solution for Robust Duplex Communication over Telephone Lines" by Denis J. G. Mestdagh, Michael R. Isaksson, and Per Ödling, published in May 2000 in IEEE Communication Magazine, pages 90 to 96, which is incorporated herein by reference.

In the application to point-to-point communication systems, different frequency bands are assigned for the transmission and reception (rising direction, falling direction). In this known application to telephony, the assigned frequency bands are the same for all the wires of a same cable and, to avoid a crosstalk phenomenon, the frequencies are not assigned to the different modems but to different cables.

This promising technique is however not directly transposable to networks using the electric supply network as a transmission support.

Among the additional problems encountered in this type of network, which make the application of the conventional Zipper-DMT technique poorly adapted, the fact that the transfer function of the transmission support considerably varies along time (for example, under the effect of the branching of an electric device), that the transfer function varies from one node to the other, and the fact that it is a multiple-path and multiple-reflection network, should be noted.

WO-A-99 23764 discloses a data transmission system by frequency-division multiplexing using cyclic prefixes.

EP-A-1 065 818 discloses a transmission system wherein a distinct frequency set can be allocated to each network node.

GB-A-2 332 602 discloses a multidirectional transmission system providing sync messages at the end of the frames. These messages aim at transmission synchronization.

SUMMARY OF THE INVENTION

The present invention more specifically aims at enabling application, to point-to-multipoint and more generally multipoint-to-multipoint networks, of the Zipper-DMT technique known in point-to-point networks.

The present invention also aims at enabling that all the modems connected to the network can operate identically, without it being necessary to have a master node to manage the traffic on the network.

The present invention also aims at enabling a dynamic frequency assignment both for the transmission and the reception on each network node.

The present invention further aims at eliminating dead times in transmissions.

To achieve these and other objects, the present invention provides a method for transmitting data between at least three nodes of an orthogonal frequency-division multiplexing network, including the steps of:

assigning to each node at least one transmit frequency and one receive frequency, the assigned frequencies being different from one node to the other;

forming data symbols to be transmitted all having the same duration whatever the transmission node; and adding, to each transmitted symbol, a cyclic prefix and a cyclic suffix reproducing a predetermined number of samples, respectively of the end and of the beginning of the symbol.

According to an embodiment of the present invention, the times of beginning of the transmission of the symbols from all nodes are synchronized.

According to an embodiment of the present invention, the symbols to be transmitted are shaped to avoid inter-carrier interference.

According to an embodiment of the present invention, the duration of the cyclic suffix is greater than or equal to the maximum time of propagation over the network, taking into account all possible reflections and paths.

According to an embodiment of the present invention, the cyclic prefix has a duration greater than or equal to the pulse response of the network.

According to an embodiment of the present invention, the network transmission support is formed by the electric supply network.

According to an embodiment of the present invention, one transmit frequency set and one receive frequency set are assigned to each modem connected to the network.

According to an embodiment of the present invention, each frequency set associated with a modem is grouped in a frequency band assigned to this modem.

According to an embodiment of the present invention, the frequencies assigned to the different modems are interlaced.

According to an embodiment of the present invention, the times of beginning of the transmission of the symbols from all nodes are automatically synchronized upon each branching of a new modem on the network.

According to an embodiment of the present invention, a specific communication channel is used to synchronize the transmissions of the different modems.

The foregoing objects, features and advantages of the present invention will be discussed in detail in the following non-limiting description of specific embodiments in connection with the accompanying drawings.

BRIEF DESCRIPTION OF THE DRAWINGS

FIG. 1, previously described, very schematically shows a network using the electric supply lines as a transmission medium;

FIG. 2 illustrates, in the form of timing diagrams, an embodiment of the present invention;

DETAILED DESCRIPTION

Figure 3A:
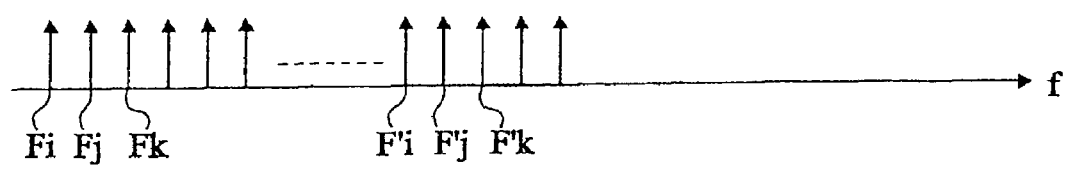
FIGS. 3A and 3B illustrate two frequency assignment modes according to the present invention.

The same elements have been designated with the same references in the different drawings. For clarity, only those elements and those steps of the method which are useful to the understanding of the present invention have been shown in the drawings and will be described hereafter. In particular, the data to be transmitted and their possible coding have not been detailed. The data to be transmitted and the possible coding of these data as well as their transmission protocols depend on the applications, and the present invention may be implemented whatever these types of data and transmission protocols. Further, the access control mechanisms and other mechanisms necessary to the network operation (for example, priority management, etc.) have not been detailed. The possible adaptation of these mechanisms to implement the present invention uses well known techniques within the abilities of those skilled in the art.

According to the present invention, each node of the network is assigned a frequency set for its transmissions and a receive frequency set. The transmit and receive frequency sets are different for each node and the transmit frequencies are different from the receive frequencies for a same node. These transmit and receive frequency assignments for each node are managed by the access control mechanism of the network.

A feature of the present invention is to provide, in the transmission flow, a cyclic prefix and suffix for each transmitted OFDM symbol. This amounts, in the time field and upon transmission of each symbol, to reproducing a predetermined number of samples, respectively of the end and of the beginning of the symbol, to fill up the inter-symbol intervals. The number of reproduced samples (or the duration of the prefixes and suffixes) is the same for all transmission flows, but the prefixes may have durations different from those of the suffixes.

The cyclic prefix of each symbol amounts, in the time field, to providing a replica of the last few microseconds of the OFDM symbol that are copied before the symbol, in the segment separating two symbols. The function of the cyclic prefix is to absorb the inter-symbol interference which results from the fact that the delay of a channel is not constant with frequency (that is, the pulsed response of the transmission channel). The use of a cyclic prefix for OFDM symbols in a network using the mains as a transmission support is known from above-mentioned article "HomePlug Standard Brings Networking to the Home".

The prefix and the suffix provided by the present invention are used to avoid use of analog filters. Indeed, by repeating part of the data at the beginning and the end of a symbol, discontinuities upon reception of different symbols simultaneously received by different nodes are avoided. Such discontinuities translate, on the receive side for the direct Fourier transform, by noise extending over the adjacent (carrier) frequencies, which adversely affects a correct reception. Since, according to the present invention, dead times between symbols are filled in the time field by the repeated data and the operation of a direct Fourier transform is cyclic, the starting point for taking into account a symbol may vary within the interval containing the signal, that is, the duration of the symbol plus the prefixes and suffixes, without loss of any information. This amounts to saying that the carriers of the different symbols keep their orthogonality in the frequency range. It is thus possible to no longer use analog filters but to only demodulate the receive frequencies assigned to the receiver. This is made possible since, further, each modem (more generally, each node) is assigned one set of transmit frequencies and one set of receive frequencies.

Further, the present invention requires no time-division multiple access, which results in a greater general capacity, as well as a more efficient priority and quality-ofservice control.

FIG. 2 illustrates, by simplified diagrams, an embodiment of the present invention.

Assume a data transmission flow 11, transmitted by node Ni at a time t0. This flow successively contains OFDM symbols Dq, Dq+1. Each symbol is preceded by the preceding or following symbol by a segment in which is copied a portion of each of the neighboring symbols. In practice and according to the present invention, each symbol Dq is preceded by a prefix Pq reproducing a time interval corresponding to the end of symbol Dq and is followed by a suffix Sq corresponding to a copy of the beginning of symbol Dq.

In the time field, other data flows at different frequencies overlap on receive node Ni. As illustrated in FIG. 2, these overlappings first result from reflections 12 of transmitted flow 11. These reflections of course are reproductions in time of original flow 11 delayed according to the propagation times. To simplify, only two reflections 12 have been shown. It should however be noted that these reflections are multiple in such a network.

Other interferences are formed by the symbol flows 13 transmitted by other nodes in the network. In the example of FIG. 2, three flows 13 corresponding to transmissions from nodes Nj, Nk, and Nl have been shown. The structure of each data flow is the same as that discussed for flow 11, that is, each time includes a prefix P and a suffix S associated with each symbol. Of course, multiple reflections of flows 13 also reach node Ni.

The frequencies in which flows 13 are transmitted are different for each of these flows and different from the frequencies in which flow 11 is transmitted. Accordingly, on the side of node Ni, the receive frequencies which are assigned thereto can be easily accepted. It is enough for the receive window to be included between times t1 and t2 between which only the symbols of same rank (q) are present. The determination of the receive window within range t1-t2 is performed in a conventional initialization phase (time synchronization) at the beginning of each communication and may be adapted (set back in phase) during communication.

It should be noted that, once back in the frequency field (after the direct Fourier transform), the fact that the recovered modulated data come from body D of the symbol or from suffix S has no more importance.

Figure 3B:
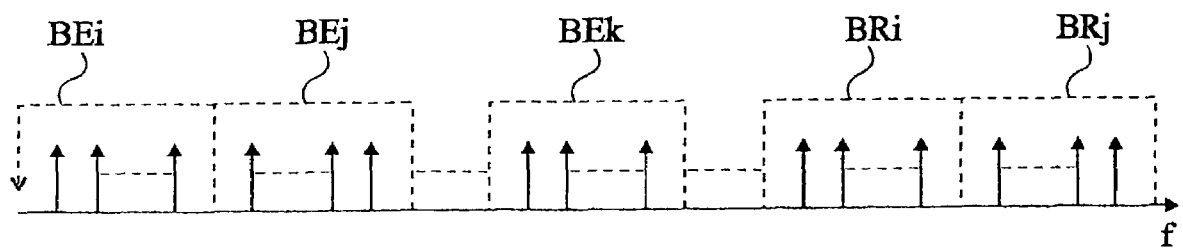

FIGS. 3A and 3B illustrate the operation of the present invention according to whether the frequency assignments to each transceiver are interlaced (FIG. 3A) or grouped. In the first case, each node Ni, Nj, Nk has carrier frequencies Fi, Fj, Fk, F'i, F'j, F'k which are individually close to the frequencies of the two other nodes. In the second case, each node is assigned a frequency band BEi, BEj, BEk for transmission and a frequency BRi, BRj, BRk for reception, all carrier frequencies of the band of a group being close to one another. This implementation difference simply conditions the demodulator frequencies, but has no incidence upon the prefix and suffix transmission flows.

The actual frequency assignments are performed by conventional means. In particular, these frequency assignments are performed while taking into account the fact that the modulation is an amplitude and phase quadrature modulation. Constellations of more or fewer points (for example, ranging between 4 and 1024 points) may be used according to the signal-to-noise ratio. It will only be ascertained, as is conventional, to avoid overlapping the next constellation point with the noise of the involved point.

According to the present invention, the length of the cyclic suffix is chosen according to the propagation delays of the network and, more specifically, to the reflection or reception delay of the signals on a given node.

According to a first embodiment, each transmitter of the network starts transmitting as soon as it receives a symbol. In this case, the suffix duration corresponds to twice the maximum propagation time in the network, taking into account all possible reflections and paths (multiple-paths).

According to a second preferred embodiment, corresponding to the illustration of FIG. 2, the transmission of the different modems is synchronized so that all the modems connected to the network nodes transmit simultaneously. In this case, the duration of the cyclic suffix may advantageously be limited to once the maximum propagation time of the network, taking into account all the possible reflections and multiple-paths.

According to a still preferred embodiment, use of a synchronization of the transmissions is avoided by shaping the OFDM symbols to be transmitted to avoid, upon reception on a same node, intercarrier interference of several symbols transmitted by different nodes. Such a shaping technique is perfectly well known in other fields of application of OFDM symbols such as, for example, the receiving of video signals on reception antennas of terrestrial radio signals (rack antenna) or telephony, and is described, for example, in above-mentioned article "Zipper VDSL: A Solution for Robust Duplex Communication over Telephone Lines". Such a shaping however imposes grouping the carriers of each set assigned to each node (FIG. 3B).

It should be noted that, to implement the present invention, all OFDM symbols should have the same length (duration T). This length is defined by interval $\Delta f$ between two successive carriers of the amplitude and phase quadrature modulation ($T=1/\Delta f$).

A significant difference of the point-to-multipoint or multipoint-to-multipoint application (that is, of a network having more than two nodes) with respect to the point-to-point application of telephony, is that, in telephony, it is avoided to assign different frequencies to the different modems to avoid any crosstalk. Conversely, according to the present invention, it is indispensable to assign to each modem at least one transmit frequency and at least one receive frequency distinct from those of the other modems.

Conventionally, to avoid use of complex equalizers in receive mode and avoid intersymbol interference, the duration of the cyclic prefixes is greater (at least equal) than the pulsed response of the transmission network.

The possible synchronization of the network nodes may be performed independently. For example, a signaling channel which conveys a reference time signal of the network may be used. It is assumed that all modems are plugged on mains connection taps. Upon turning-on of one of the modems, said modems permanently sends a specific OFDM signal formed of predefined data over a predefined signaling frequency set. Upon reception by another turned-on modem, the latter immediately sends back a response signal on another predefined signaling frequency. When the first modem receives the response, it can calculate the propagation duration that it sends back in a specific channel. Upon reception of the content of this channel, the second modem now knows the duration to be applied for a transmission to its own OFDM signals, so that the two above-mentioned modems are now capable of transmitting signals at the same time.

During this initialization phase, collisions may occur if another modem performs the same operation as the second one. This problem can be solved by providing random mechanisms which consist, when a collision occurs, of placing each node in a waiting mode for a duration determined by a random generator. This random receiver allows again the involved modem to subsequently restart some initialization cycles.

Of course, the present invention is likely to have various alterations, modifications, and improvements which will readily occur to those skilled in the art. In particular, the implementation of the transmission method of the present invention is within the abilities of those skilled in the art based on the functional indications given hereabove. Further, although the present invention has been described in more specific relation with a network using the power cables as a transmission medium, the present invention may also apply to any other point-to-multipoint or multipoint-to-multipoint network in which similar problems are posed. For example, the present invention may be applied to wireless communications in which the problems of the variation of the transfer function along time are posed, and which are multiple-path and multiple-reflection communications.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for transmitting data between at least three nodes of an orthogonal frequency-division multiplexing network, including:
    assigning to each node at least one transmit frequency and one receive frequency, the assigned frequencies being different from one node to the other;
    forming data symbols to be transmitted, all having the same duration; and
    adding, to each transmitted symbol, a cyclic prefix and a cyclic suffix reproducing a predetermined number of samples, respectively, of the end and of the beginning of the symbol, wherein the duration of the cyclic suffix is greater than or equal to the maximum time of propagation over the network, taking into account all possible reflections and paths.

2. The method of claim 1, wherein the times of beginning of the transmission of the symbols from all nodes are synchronized.

3. The method of claim 1, including shaping the symbols to be transmitted to avoid inter-carrier interference.

4. The method of claim 1, wherein the cyclic prefix has a duration greater than or equal to the pulse response of the network.

5. The method of claim 1, wherein a network transmission support formed by an electric supply network.

6. The method of claim 1, wherein each node includes a modem, further including assigning one transmit frequency set and one receive frequency set to each modem connected to the network.

7. The method of claim 6, wherein each frequency set associated with a modem is grouped in a frequency band assigned to this modem.

8. The method of claim 6, wherein the frequencies assigned to the different modems are interlaced.

9. A method for transmitting data between at least three nodes of an orthogonal frequency-division multiplexing network, including:
    assigning to each node at least one transmit frequency and one receive frequency, the assigned frequencies being different from one node to the other;

forming data symbols to be transmitted, all having the same duration; and adding, to each transmitted symbol, a cyclic prefix and a cyclic suffix reproducing a predetermined number of samples, respectively, of the end and of the beginning of the symbol, wherein the times of beginning of the transmission of the symbols from all nodes are automatically synchronized upon each branching of a new modem on the network.

10. The method of claim 9, wherein a specific communication channel is used to synchronize the transmissions of the nodes.

11. Apparatus for transmitting data between nodes of an orthogonal frequency division multiplexing network, comprising:

means for forming data symbols to be transmitted; and means for adding to each transmitted data symbol a cyclic prefix and a cyclic suffix that reproduce a predetermined number of samples of the end and of the beginning, respectively, of the symbol, wherein the means for adding is configured such that the duration of the cyclic suffix is greater than or equal to the maximum time of propagation over the network, taking into account all possible reflections and paths.

12. Apparatus as defined in claim 11, further including means for shaping the data symbols to be transmitted to avoid inter-carrier interference.

13. Apparatus as defined in claim 11, wherein the means for adding is configured such that the cyclic prefix has a duration at least as long as the pulse response of the network.

14. An orthogonal frequency division multiplexing network, comprising:

at least three data transmission nodes in communication with one another, each of the nodes including means for forming data symbols to be transmitted, means for adding to each transmitted data symbol a cyclic prefix and a cyclic suffix that reproduce a predetermined number of samples of the end and of the beginning, respectively, of the symbol, and means for assigning to each node at least one transmit frequency and one receive frequency, each assigned frequency being assigned at most once as a transmit frequency and once as a receive frequency, wherein the means for adding is configured such that the duration of the cyclic suffix is greater than or equal to the maximum time of propagation over the network, taking into account all possible reflections and paths.

15. A network as defined in claim 14, configured such that the beginning times of the symbols transmitted from the nodes are synchronized.

16. A network as defined in claim 15, further comprising a communication channel configured to synchronize the transmissions of the symbols.

17. A network as defined in claim 16, wherein each of the nodes includes means for shaping the symbols to be transmitted to avoid inter-carrier interference.

18. A network as defined in claim 14, wherein the means for adding is configured such that the cyclic prefix has a duration at least as long as the pulse response of the network.

19. A network as defined in claim 14, wherein the nodes are connected together using an electric supply network.

20. A network as defined in claim 14, wherein each of the nodes includes a modem, and wherein the means for assigning is adapted to assign one transmit frequency set and one receive frequency set to each modem.

21. A network as defined in claim 20, wherein each frequency set associated with a selected modem is grouped in a frequency band assigned to the selected modem.

22. A network as defined in claim 20, wherein the frequencies assigned to the modems are interlaced.

23. A network as defined in claim 14, wherein the means for forming data symbols are configured such that all data symbols have equal duration.

24. A method for transmitting data between at least three nodes of an orthogonal frequency division multiplexing network, comprising:

forming data symbols to be transmitted;

adding to each transmitted data symbol a cyclic prefix and a cyclic suffix that reproduce a predetermined number of samples of the end and of the beginning, respectively, of the symbol, including adding to each transmitted data symbol a cyclic suffix such that the duration of the cyclic suffix is greater than or equal to the maximum time of propagation over the network, taking into account all possible reflections and paths; and assigning to each node at least one transmit frequency and one receive frequency, each assigned frequency being assigned at most once as a transmit frequency and once as a receive frequency.

25. A method as defined in claim 24, further including shaping the symbols to be transmitted to avoid inter-carrier interference.

26. A method as defined in claim 24, including adding to each transmitted data symbol a cyclic prefix having a duration at least as long as the pulse response of the network.

* * * * *

UNITED STATES PATENT AND TRADEMARK OFFICE
CERTIFICATE OF CORRECTION

| | | |
|---|---|---|
| PATENT NO. | : 7,277,381 B2 | Page 1 of 1 |
| APPLICATION NO. | : 10/163175 | |
| DATED | : October 2, 2007 | |
| INVENTOR(S) | : Denis Julien Gilles Mestdagh | |

It is certified that error appears in the above-identified patent and that said Letters Patent is hereby corrected as shown below:

Col. 5, line 66 should read:
as well as a more efficient priority and quality-of-service Signed and Sealed this Twenty-seventh Day of November, 2007

JON W. DUDAS
*Director of the United States Patent and Trademark Office*